(12) United States Patent
Zhuang

(10) Patent No.: US 12,295,463 B2
(45) Date of Patent: May 13, 2025

(54) PUSH BUTTON CONNECTOR

(71) Applicant: WENZHOU YUANFEI PET TOY PRODUCTS CO., LTD., Wenzhou (CN)

(72) Inventor: Mingyun Zhuang, Wenzhou (CN)

(73) Assignee: WENZHOU YUANFEI PET TOY PRODUCTS CO., LTD., Wenzhou (CN)

( * ) Notice: Subject to any disclaimer, the term of this patent is extended or adjusted under 35 U.S.C. 154(b) by 30 days.

(21) Appl. No.: 18/464,525

(22) Filed: Sep. 11, 2023

(65) Prior Publication Data
US 2025/0049179 A1 Feb. 13, 2025

(30) Foreign Application Priority Data
Aug. 10, 2023 (CN) .......................... 202311013880.1

(51) Int. Cl.
*F16B 45/02* (2006.01)
*A44B 11/25* (2006.01)
*F16B 45/06* (2006.01)

(52) U.S. Cl.
CPC ........... *A44B 11/2511* (2013.01); *F16B 45/06* (2013.01)

(58) Field of Classification Search
CPC ........... Y10T 24/4435; Y10T 24/44342; Y10T 24/45702; Y10T 24/3493; Y10T 24/4512; Y10T 24/4511; Y10T 24/45089; F16B 45/04; F16B 45/06; F16B 45/035; F16B 45/034; F16B 45/033; F16B 45/029; F16B 45/021; F16B 45/026; F16B 45/024; F16B 45/023; F16B 45/02; A44B 11/2511
USPC ..... 294/110.1, 82.18, 82.32; 24/601.5, 598.5
See application file for complete search history.

(56) References Cited

U.S. PATENT DOCUMENTS

| | | | | |
|---|---|---|---|---|
| 597,668 | A | * | 1/1898 | Davison .................. F16B 45/06 24/598.5 |
| 622,201 | A | * | 4/1899 | Brassington .......... F16B 45/035 24/598.5 |
| 641,265 | A | * | 1/1900 | Brassington ............ F16B 45/06 24/598.5 |

(Continued)

FOREIGN PATENT DOCUMENTS

| | | |
|---|---|---|
| CN | 201480195 U | 5/2010 |
| CN | 301911817 S | 5/2012 |
| TW | 202315542 A | 4/2023 |

*Primary Examiner* — Jason W San
*Assistant Examiner* — Michael S Lee
(74) *Attorney, Agent, or Firm* — Westbridge IP LLC

(57) ABSTRACT

A push button connector includes a first panel, a first trigger, a second trigger, and a slider. The first panel has a first pivot and a second pivot parallel to it. The first trigger includes a first connecting portion and a first buckle ring connected to each other. The first connecting portion is connected to the first pivot and can rotate around it. The first buckle ring is generally ring-shaped with a first opening. The second trigger includes a second connecting portion and a second buckle ring connected to each other. The second connecting portion is connected to the second pivot and can rotate around it. The slider is connected to the first panel. Both triggers have open and closed positions, with the buckle ring closing the opening in the closed position. The slider drives both triggers between these positions. This push button connector ensures easy operation and high safety.

19 Claims, 14 Drawing Sheets

(56) References Cited

U.S. PATENT DOCUMENTS

| | | | | |
|---|---|---|---|---|
| 644,699 A | * | 3/1900 | Woodford | B66C 1/36 |
| | | | | 70/459 |
| 1,000,868 A | * | 8/1911 | Williams | A01K 1/06 |
| | | | | 24/598.5 |
| 1,684,322 A | * | 9/1928 | Itjen | F16B 45/06 |
| | | | | 24/598.5 |
| 2,476,734 A | * | 7/1949 | Jellison | F16B 45/035 |
| | | | | 24/598.5 |
| 2,658,236 A | * | 11/1953 | Altenpohl | A22C 21/0007 |
| | | | | 294/81.61 |
| 3,952,382 A | * | 4/1976 | Vaage | F16B 45/06 |
| | | | | 24/598.5 |
| 11,026,464 B2 | | 6/2021 | Axelsson et al. | |
| 11,199,244 B2 | | 12/2021 | Nanbu et al. | |
| 11,219,279 B2 | | 1/2022 | Nanbu et al. | |
| 11,506,232 B2 | | 11/2022 | Thaib et al. | |
| 2011/0010896 A1 | * | 1/2011 | Schlipper | F16B 45/029 |
| | | | | 24/165 |
| 2022/0234480 A1 | | 7/2022 | Chen | |
| 2022/0314925 A1 | | 10/2022 | Cheng et al. | |
| 2023/0174186 A1 | | 6/2023 | David et al. | |

* cited by examiner

PUSH BUTTON CONNECTOR

CROSS-REFERENCE TO RELATED APPLICATIONS

This application claims priority to Chinese Patent Application No. 202311013880.1, filed on Aug. 10, 2023, the content of which is incorporated herein by reference in its entirety.

TECHNICAL FIELD

The present application relates to the field of outdoor equipment technology, specifically a push button connector.

BACKGROUND

In daily life, connecting devices are commonly used to conveniently and quickly connect two objects.

Chinese Design Patent CN301911817S discloses a buckle connector (refer to FIGS. 1 and 2), but this type of buckle connector has several issues in practical use.

Firstly, the existing buckle connector has only a small hole 22 at the lower end, and the hole 22 is penetrated by a rod-like object 23, which only allows thin ropes to pass through. When non-metal ropes pass through, there is a high risk of wear between the rope and the front and back panels of the buckle connector, as well as the rod-like object, greatly affecting the service life of the rope and endangering the safety of users. When metal ropes pass through, similar wear phenomena occur, causing severe wear on the rope and even thinning and fracture of the rod-like object. Due to the small size of the hole for threading the rope, it is also time-consuming and laborious to thread the rope, which is very inconvenient.

Secondly, the existing buckle connector maintains the distance between the lower ends of the front panel 24 and the back panel 25 through a rod-like object 23 and two side panels 26. Whether in the front or back, the side panels 26 protrude noticeably from the front and back panels, resulting in a locally larger thickness of the buckle connector, which is not conducive to storage. Moreover, the protruding part of the side panels 26 may also cause friction with the rope, affecting the rope's lifespan.

Furthermore, the existing buckle connector is opened by pressing down on its two sides using an operating part 27. The overall length of the operating part 27 is long, and the maximum distance between the left and right operating parts 27 is significantly larger than the width of the front and back panels. Although this design achieves the purpose of effortless operation, it brings extremely serious safety hazards. In practical use scenarios, the buckle connector is often in a suspended state and frequently swings horizontally. If the operating part 27 of the buckle connector collides with certain objects during the swinging process, one of the locking plates will open. At this time, the load-bearing capacity of the buckle connector will be halved. If the weight carried by the buckle connector exceeds the reduced load-bearing capacity, the locking plate will fracture, posing a serious threat to the life and property safety of the user.

SUMMARY

A push button connector is provided to solve the shortcomings of the prior art, and is intended to at least partially solve one of the technical problems in the prior art.

To achieve the above objectives, the present application provides the following technical solution.

A push button connector, comprising a first panel, a first trigger, a second trigger, and a slider. One side of the first panel is provided with a first pivot and a second pivot parallel to the first pivot. The first trigger comprises a first connecting portion and a first buckle ring that are interconnected. The first connecting portion is connected to the first pivot and is rotatable about the first pivot. The first buckle ring is approximately ring-shaped and has a first opening. The second trigger comprises a second connecting portion and a second buckle ring that are interconnected. The second connecting portion is connected to the second pivot and is rotatable about the second pivot. The slider is connected to the first panel. The first trigger and the second trigger both have an open position that opens the first opening and a closed position where the second buckle ring closes the first opening. The slider can simultaneously drive the first trigger and the second trigger to rotate between the open position and the closed position.

In some embodiments, the slider is slidably connected to the first panel, and the slider can move along a straight line perpendicular to the plane where the first pivot and the second pivot are located. One side of the slider is provided with a first rack, and the other side of the slider is provided with a second rack. The first connecting portion and the second connecting portion are both provided with teeth, and the first rack meshes with the teeth on the first connecting portion, and the second rack meshes with the teeth on the second connecting portion.

In some embodiments, the push button connector further comprises a lever and a connecting rod. The first panel is provided with an elongated slot in the length direction, which is consistent with the movement direction of the slider. The lever and the slider are located on opposite sides of the first panel, and the connecting rod is located inside the slot, with one end connected to the lever and the other end connected to the slider.

In some embodiments, the push button connector further comprises a second panel connected to the first panel, and the first trigger, the second trigger, the slider, the first pivot, and the second pivot are located between the first panel and the second panel.

In some embodiments, the second buckle ring is approximately ring-shaped and has a second opening. When the first trigger and the second trigger are in the open position, the projection of the first opening on the first panel overlaps at least partially with the projection of the second opening on the first panel, so that both the first opening and the second opening are open simultaneously. When the first trigger and the second trigger are in the closed position, the first buckle ring closes the second opening.

In some embodiments, one end of the first panel is provided with a groove, with one end of the groove open. When the first trigger is in the open position, the projection of the first opening on the first panel overlaps with the groove.

In some embodiments, the push button connector further comprises connecting pillars, with one end of the connecting pillars connected to the first panel and the other end connected to the second panel.

In some embodiments, there are two connecting pillars, with each connecting pillar located on one side of the groove.

In some embodiments, both the first buckle ring and the second buckle ring are provided with a first limiting portion. When the first trigger and the second trigger are in the closed position, the first limiting portion abuts against the connecting pillars to prevent the first trigger and the second trigger from rotating in a direction away from the open position.

In some embodiments, both the first buckle ring and the second buckle ring are provided with a second limiting portion. The second limiting portion on the first buckle ring is located near the first opening, and the second limiting portion on the second buckle ring is located near the second opening. When the first trigger and the second trigger are in the open position, the first limiting portion abuts against the connecting pillars to prevent the first trigger and the second trigger from rotating in a direction away from the closed position.

In some embodiments, the push button connector further comprises a first elastic member and a second elastic member. The first elastic member applies elastic force to the first trigger to drive it towards the closed position, and the second elastic member applies elastic force to the second trigger to drive it towards the closed position.

In some embodiments, the first elastic member is a first torsion spring fitted on the first pivot, and the second elastic member is a second torsion spring fitted on the second pivot. One end of the first torsion spring is fixed to the first trigger, and the other end of the first torsion spring is fixed to the first panel and/or the second panel. One end of the second torsion spring is fixed to the second trigger, and the other end of the second torsion spring is fixed to the first panel and/or the second panel.

In some embodiments, the slider is provided with a first recess, and a compression spring is provided inside the first recess. A sphere is provided between the compression spring and the second panel, with the diameter of the sphere being smaller than the diameter of the first recess but larger than the inner diameter of the compression spring. The second panel is provided with a second recess, with the depth of the second recess being smaller than the radius of the sphere. When the first trigger is in the open position, a portion of the sphere is located inside the first recess, and another portion is located inside the second recess.

In some embodiments, the first panel and/or the second panel are provided with guide slots, with the extension direction of the guide slots being consistent with the movement direction of the slider. The slider is provided with guide blocks, with at least a portion of the guide blocks inserted into the guide slots.

In some embodiments, the push button connector further comprises a connecting member, which is connected to at least one of the first panel and the second panel. The connecting member is provided with a through hole for the rope to pass through.

In some embodiments, the connecting member is provided with a mounting hole, the first panel is provided with a first protrusion, and the second panel is provided with a second protrusion. Both the first protrusion and the second protrusion are inserted into the mounting hole, and the first protrusion and the second protrusion are provided with an anti-detachment block that is located on opposite sides of the mounting hole.

In some embodiments, the shape of the first protrusion and the second protrusion is semi-cylindrical, and when the first protrusion and the second protrusion are fitted together, they form a complete cylinder. The connecting member can rotate around the axis of this cylinder.

Compared to the prior art, the push button connector provided by the present application can be operated with a single finger. By pushing the slider with the thumb, the first trigger and the second trigger are simultaneously rotated to open or close the buckle connector, making the operation more convenient. Furthermore, the push button connector of the present application sets the toggle on the surface of the first panel, and the opening or closing of the buckle connector is controlled by pushing the toggle. During use, even if the buckle connector swings horizontally and collides with an object, it is difficult to be opened, thus providing better safety.

BRIEF DESCRIPTION OF THE DRAWINGS

To provide a clearer explanation of the embodiments of the present application or the technical solutions in the prior art, a brief introduction of the accompanying drawings used in the description of the embodiments or the prior art is provided below. The accompanying drawings described below are merely some embodiments of the present application, and ordinary skilled in the art can obtain other accompanying drawings based on these drawings without exercising creative labor.

DETAILED DESCRIPTION OF THE EMBODIMENTS

Figure 1:
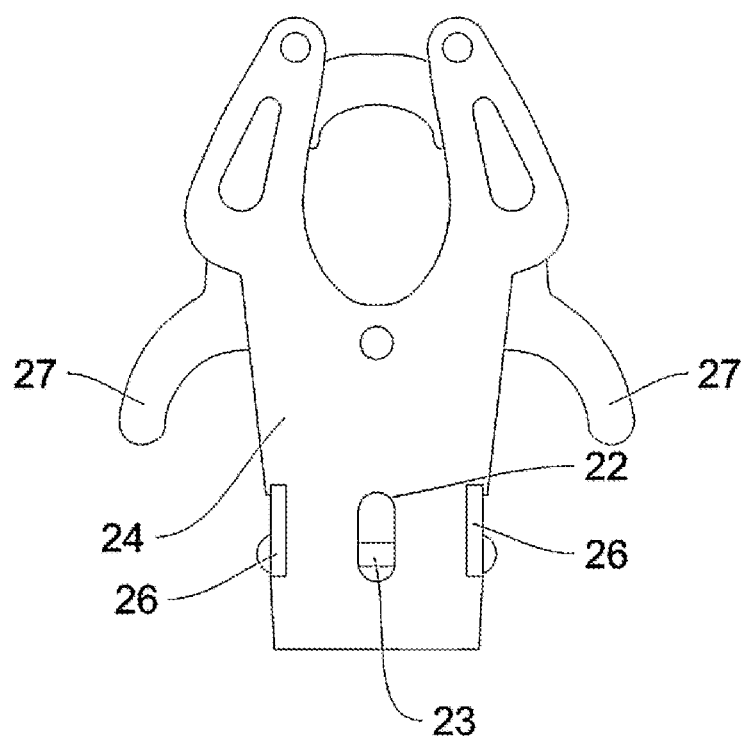
FIG. 1 shows the front view of a climbing buckle in the prior art.
Figure 2:
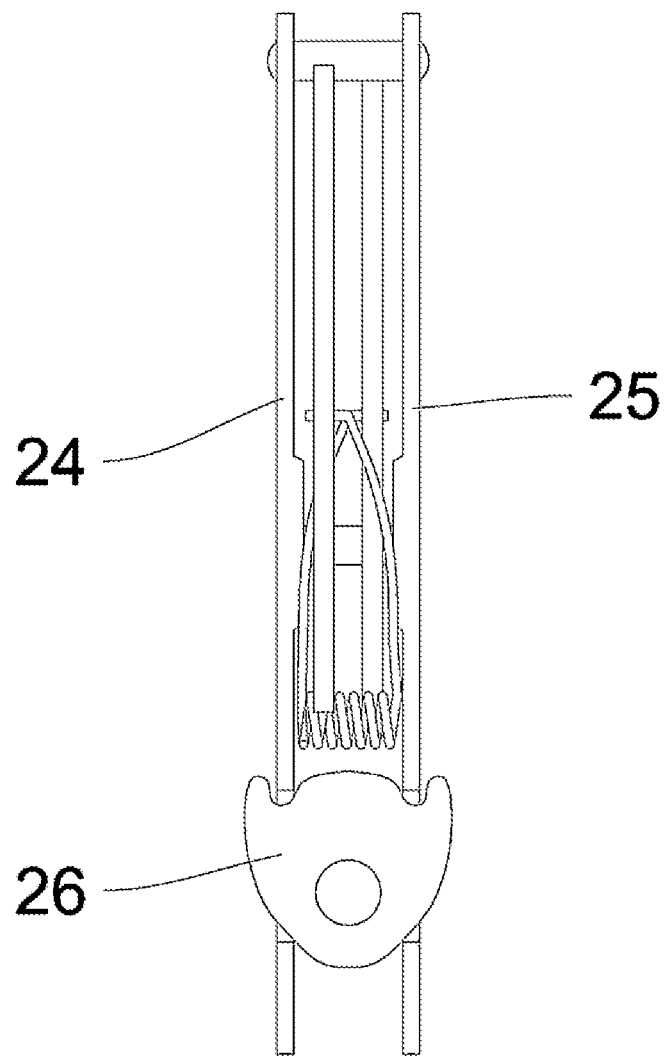
FIG. 2 shows the right view of a climbing buckle in the prior art.

To clarify the purpose, technical solution, and advantages of the present application, a detailed description of the technical solution of the present application will be provided below. The described embodiments are only a part of the embodiments of the present application, and not the entirety of the embodiments. Based on the embodiments disclosed in the present application, all other embodiments obtained by those skilled in the art without exercising inventive labor are within the scope of protection of the present application.

Referring to FIGS. 3 to 11, the present application provides a push button connector, which includes a first panel 1, a first trigger 5, a second trigger 6, and a slider 12. One side of the first panel 1 is provided with a first pivot 8 and a second pivot 9 parallel to the first pivot 8. The first trigger 5 includes a first connecting portion 501 and a first buckle ring 502 that are interconnected. The first connecting portion 501 is integrally formed with the first buckle ring 502. The first connecting portion 501 is connected to the first pivot 8 and can rotate around the first pivot 8. In a specific embodiment, the first connecting portion 501 is provided with a circular hole that matches the first pivot 8. The first pivot 8 is inserted into the corresponding circular hole on the first connecting portion 501 to achieve rotational connection between the first connecting portion 501 and the first pivot 8. The first buckle ring 502 is generally ring-shaped and has a first opening 503. In this embodiment, the first buckle ring 502 is approximately C-shaped. The second trigger 6 includes a second connecting portion 601 and a second buckle ring 602 that are interconnected. The second connecting portion 601 is connected to the second pivot 9 and can rotate around the second pivot 9. The second connecting portion 601 is integrally formed with the second buckle ring 602. The second connecting portion 601 is provided with a circular hole that matches the second pivot 9. The second pivot 9 is inserted into the corresponding circular hole on the second connecting portion 601 to achieve rotational connection between the second connecting portion 601 and the second pivot 9. The slider 12 is connected to the first panel 1. Both the first trigger 5 and the second trigger 6 have an open position that allows the first opening 503 to be open and a closed position where the second buckle ring 602 closes the first opening 503. The slider 12 can simultaneously drive the first trigger 5 and the second trigger 6 to rotate between the open position and the closed position.

In this embodiment, the first trigger 5 is preferably made of corrosion-resistant steel, such as AISI 316 stainless steel or 17-4PH steel, and optionally made of high-strength engineering plastic or copper-based alloy. The first panel 1 and the second panel 2 are preferably made of thermosetting plastic or metal alloy, and optionally made of carbon fiber epoxy composite material.

Figure 6:
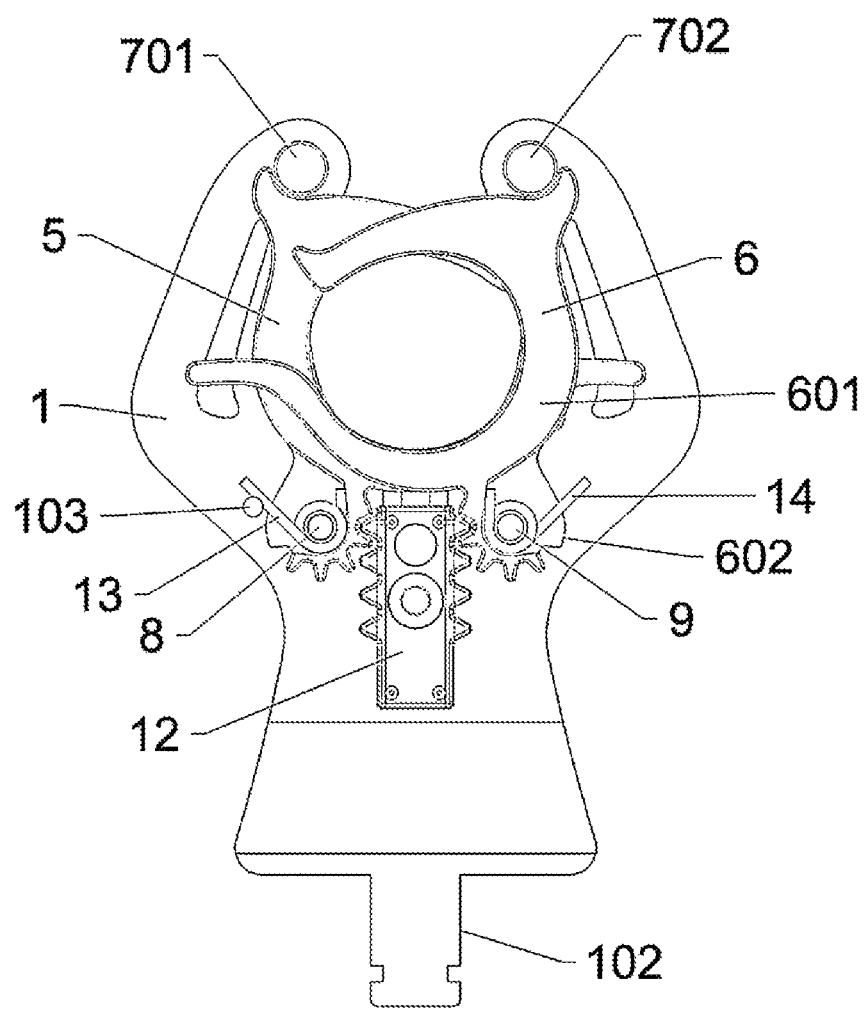
FIG. 6 shows a structural diagram of the embodiment shown in FIG. 3 with the connecting member and the second panel removed.
Figure 7:
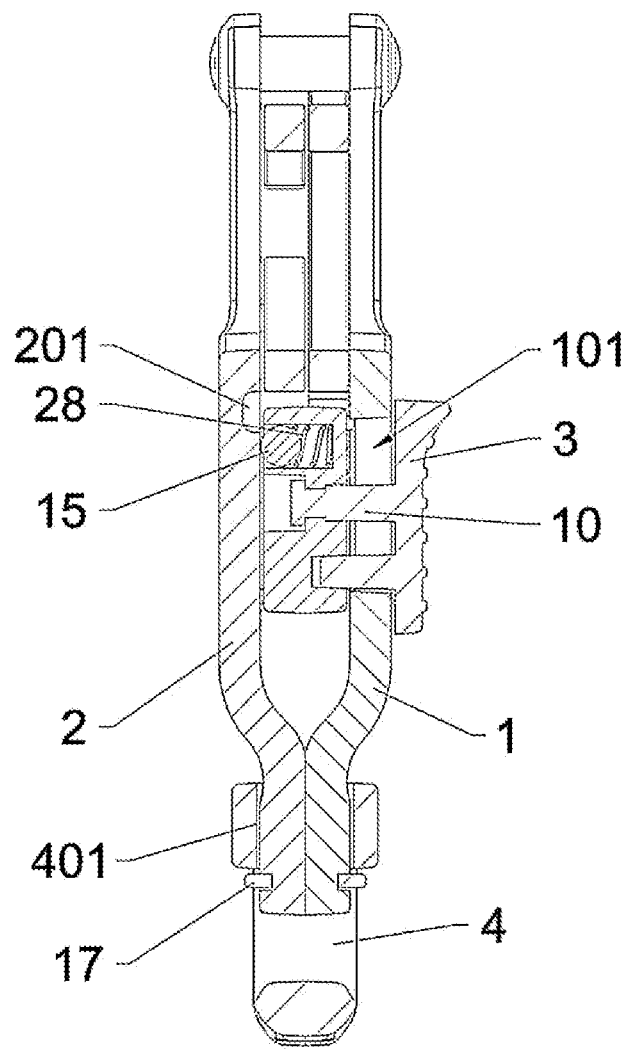
FIG. 7 shows a sectional view along line A-A in FIG. 4.
Figure 9:
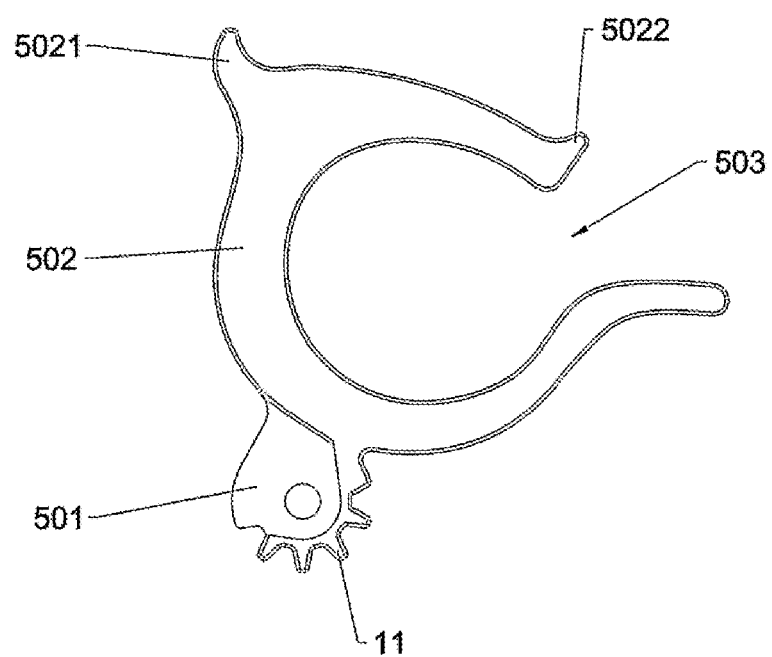
FIG. 9 shows a structural diagram of the first trigger in the embodiment of the present application.
Figure 10:
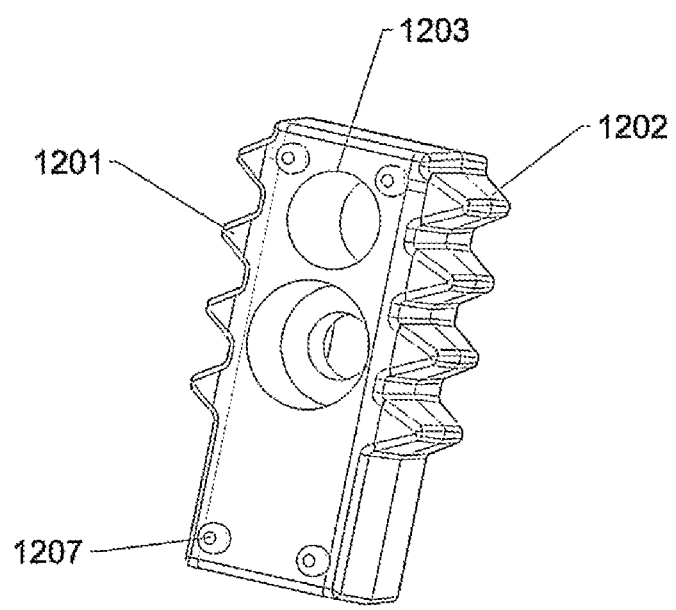
FIG. 10 shows a structural diagram of the slider in the embodiment of the present application.
Figure 11:
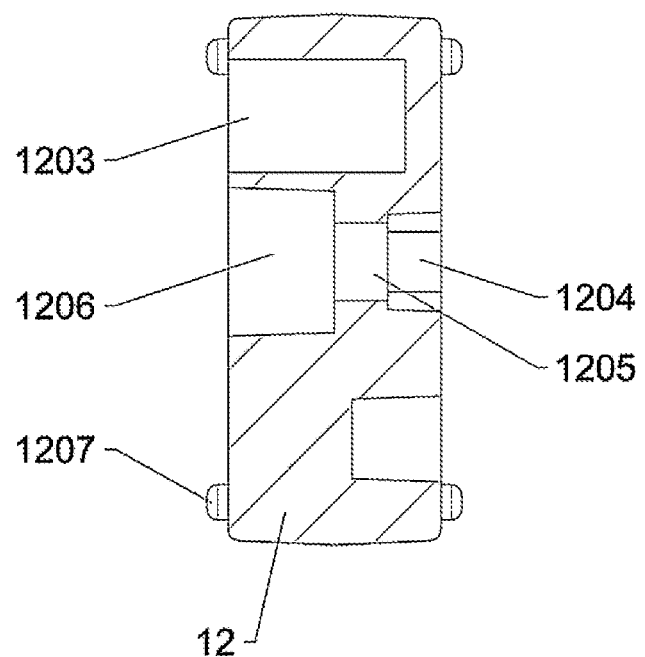
FIG. 11 shows a sectional view of the slider in the embodiment of the present application.
Figure 12:
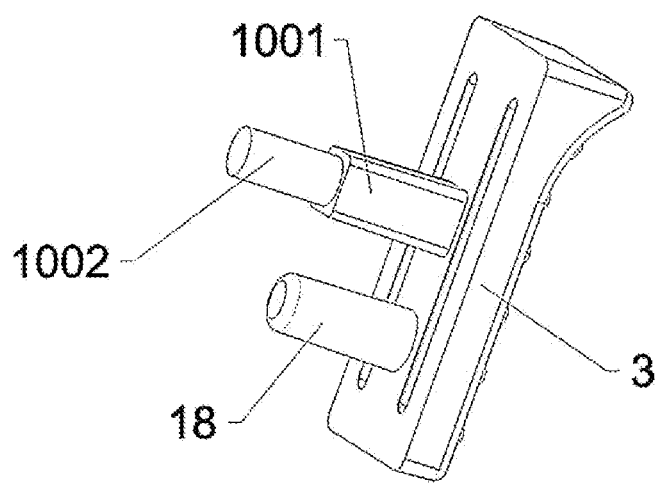
FIG. 12 shows a structural diagram of the connection between the lever and the connecting rod in the embodiment of the present application.

In this embodiment, the slider 12 is slidably connected to the first panel 1 and can move along a straight line perpendicular to the plane where the first pivot 8 and the second pivot 9 are located. One side of the slider 12 is provided with a first rack 1201, and the other side of the slider 12 is provided with a second rack 1202. Both the first connecting portion 501 and the second connecting portion 601 are provided with gear teeth 11. The first rack 1201 meshes with the gear teeth 11 on the first connecting portion 501, and the second rack 1202 meshes with the gear teeth 11 on the second connecting portion 601. As shown in FIG. 10, the first rack 1201 is fixedly connected to the left side wall of the slider 12, and the second rack 1202 is fixedly connected to the right side wall of the slider 12. In some embodiments, the first rack 1201, the second rack 1202, and the slider 12 can also be integrally formed. As shown in FIGS. 6 and 9, the gear teeth 11 on the outer peripheral wall of the first connecting portion 501 and the second connecting portion 601 only cover a portion of the wall, thereby forming an incomplete gear structure on the outer peripheral wall of the first connecting portion 501 and the second connecting portion 601.

Figure 3:
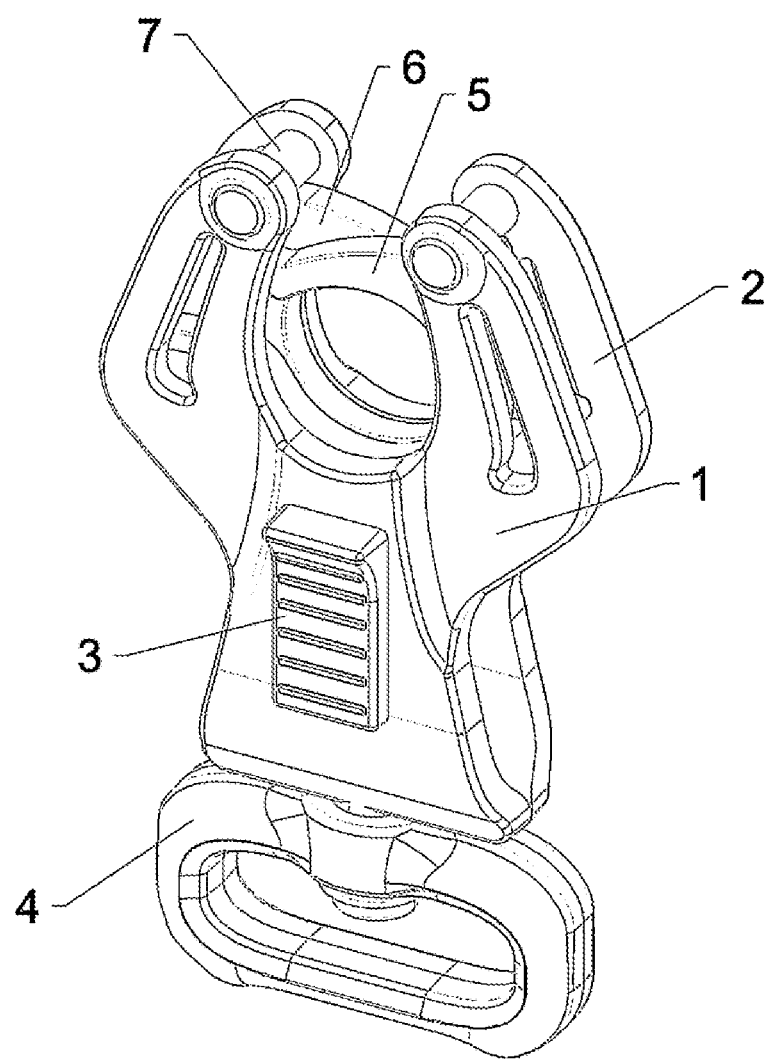
FIG. 3 shows a three-dimensional view of an embodiment of the present application.

In some embodiments, the push button connector further includes a lever 3 and a connecting rod 10. The first panel 1 is provided with a elongated slot 101, and the length direction of the slot 101 is consistent with the movement direction of the slider 12. The lever 3 and the slider 12 are located on opposite sides of the first panel 1, and the connecting rod 10 is disposed in the slot 101. One end of the connecting rod 10 is connected to the lever 3, and the other end of the connecting rod 10 is connected to the slider 12. As shown in FIGS. 3 and 10, the surface of the lever 3 is distributed with multiple parallel anti-slip ridges. The slider 12 is provided with a stepped hole that penetrates through both ends, including a first hole 1204, a second hole 1205, and a third hole 1206 in sequence. the connecting rod 10 includes a first section 1001 and a second section 1002. The first section 1001 has a gap fit with the first hole 1204, and the second section 1002 has a gap fit with the second hole 1205. After passing through the second hole 1205, the second section 1002 extends into the third hole 1206. The portion of the second section 1002 inside the third hole 1206 can be flattened using a press machine (see FIG. 7), thereby achieving the connection between the connecting rod 10 and the slider 12. In optional embodiments, the lever 3 is also provided with positioning pillar 18, and the slider 12 is provided with circular holes on the end face adjacent to the lever 3, which match the positioning pillar 18. The positioning pillar 18 passes through the slot 101 and inserts into the corresponding circular holes to prevent the lever 3 from rotating around the connecting rod 10.

In some embodiments, the push button connector further includes a second panel 2 connected to the first panel 1, where the first trigger 5, second trigger 6, slider 12, first pivot 8, and second pivot 9 are located between the first panel 1 and the second panel 2. By mounting the first trigger 5, second trigger 6, slider 12, first pivot 8, and second pivot 9 between the first panel 1 and the second panel 2, the overall appearance of the connector is more streamlined and aesthetically pleasing, while also preventing damage to key components such as the slider 12 and extending the service life.

Figure 4:
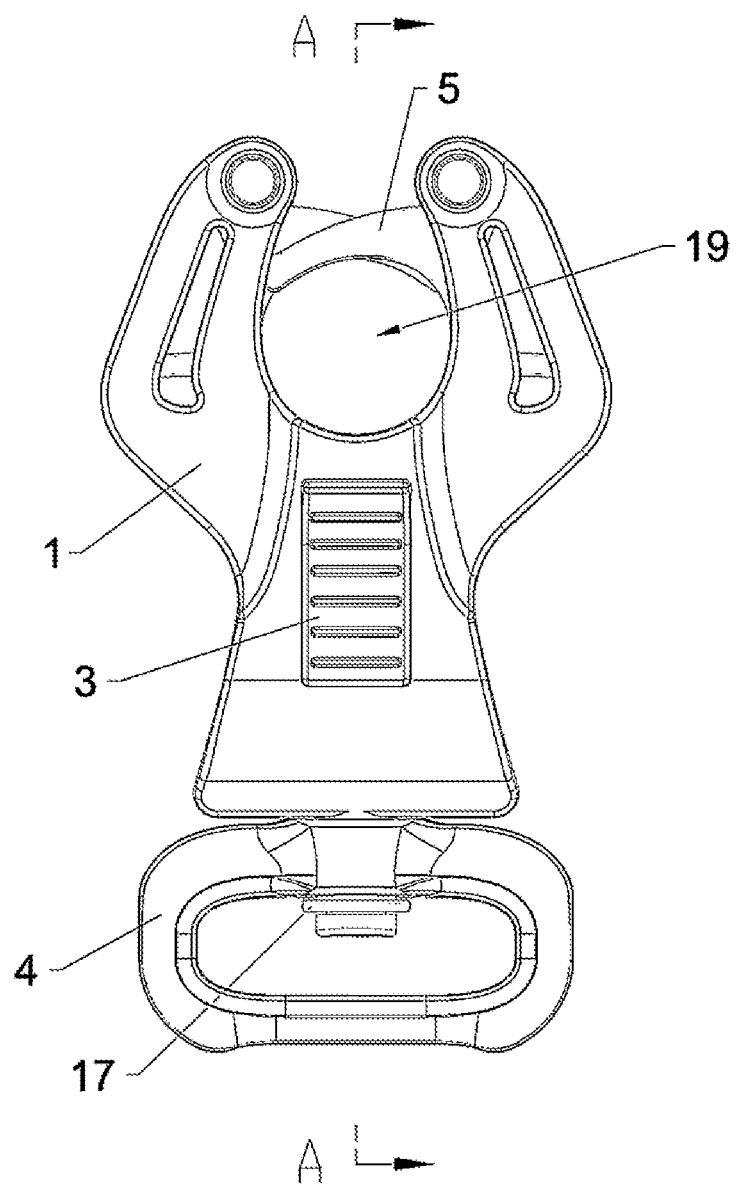
FIG. 4 shows the front view of the embodiment shown in FIG. 3.
Figure 5:
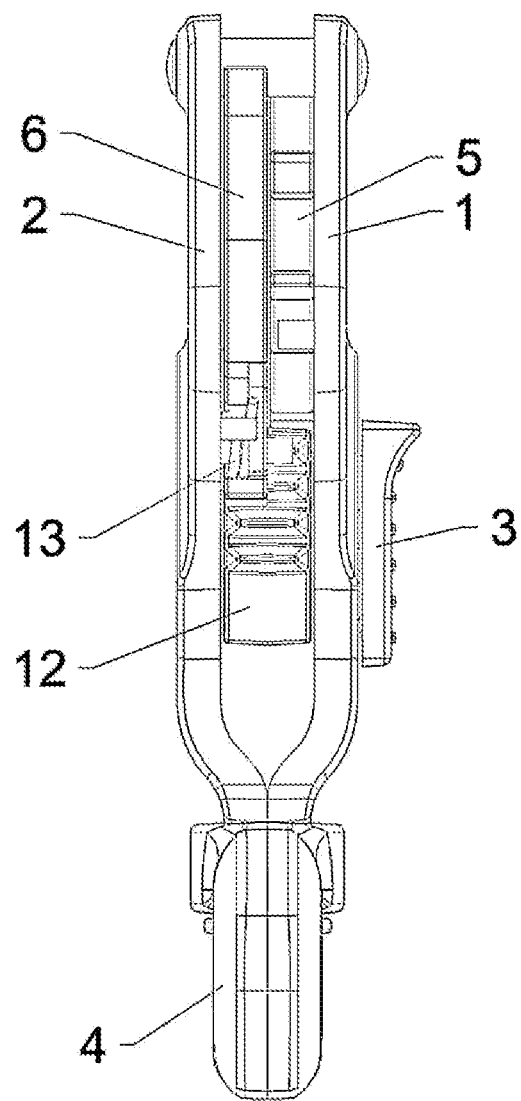
FIG. 5 shows the left view of the embodiment shown in FIG. 3.

In some embodiments, the second buckle ring 602 is approximately circular and has a second opening, as shown in FIG. 4. The structure of the second buckle ring 602 is symmetric about the line A-A with respect to the structure of the first buckle ring 502. When the first trigger 5 and the second trigger 6 are in the open position, the projection of the first opening 503 on the first panel 1 overlaps at least partially with the projection of the second opening on the first panel 1, allowing both the first opening 503 and the second opening to be fully open. As shown in FIG. 6, when the first trigger 5 and the second trigger 6 are in the closed position, the first buckle ring 502 closes the second opening, creating a space inside the first buckle ring 502 and the second buckle ring 602 for an object (such as a rope) to pass through.

Figure 13:
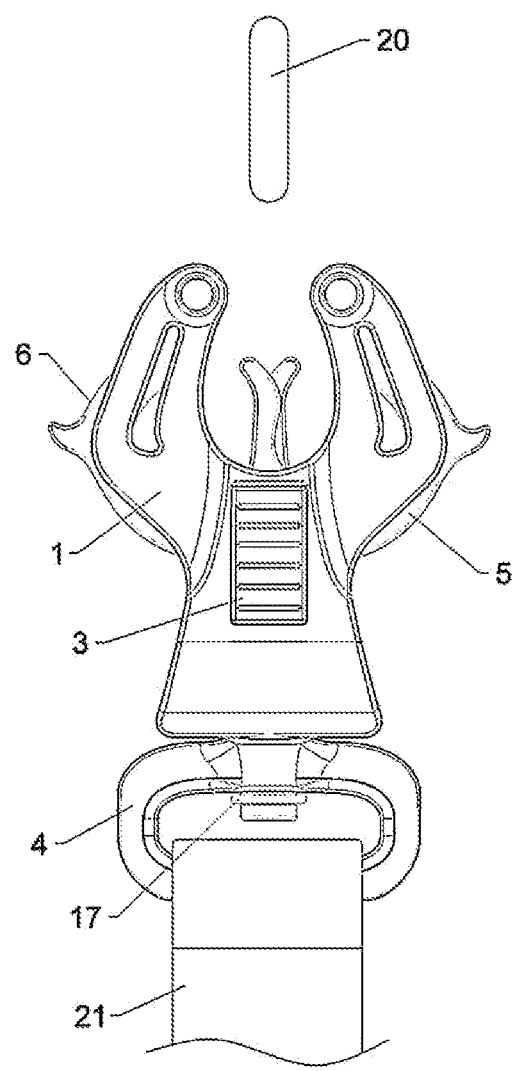
FIG. 13 shows a schematic diagram of the embodiment of the present application in use, with the first trigger in the open position.
Figure 14:
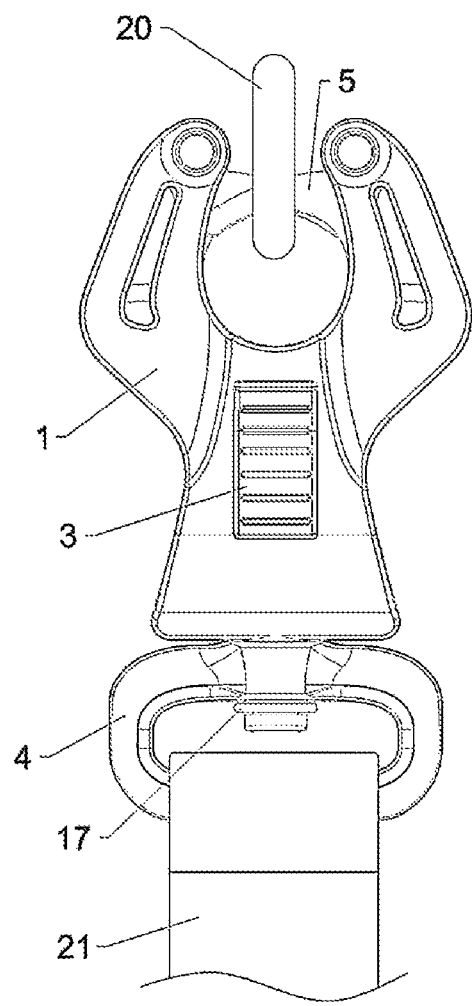
FIG. 14 shows a schematic diagram of the embodiment of the present application connected to a D-shaped buckle.

In some embodiments, one end of the first panel 1 is provided with a groove 19, with one end of the groove 19 open. When the first trigger 5 is in the open position, the projection of the first opening 503 on the first panel 1 coincides with the groove 19. The shape of the groove 19 in this embodiment is similar to a "U" shape, which facilitates the connection of rigid objects (such as a D-shaped buckle 20) or non-rigid objects (such as a loose cable or rope). As shown in FIG. 13, when the buckle is in the open state, a rope or a D-shaped buckle can be inserted through the first opening 503 into the center of the first buckle ring 502, and then pushing down the lever 3 will drive the first trigger 5 and the second trigger 6 to rotate to the closed position, enclosing the rope or D-shaped buckle with the first buckle ring 502 and the second buckle ring 602 (as shown in FIG. 14).

In some embodiments, the push button connector further includes connecting pillars 7. One end of the connecting pillar 7 is connected to the first panel 1, and the other end of the connecting pillar 7 is connected to the second panel 2. By setting the connecting pillars 7, the first panel 1 and the second panel 2 maintain a constant distance, preventing deformation of the first panel 1 and the second panel 2.

In some embodiments, the number of connecting pillars 7 is two, namely the left connecting pillar 701 and the right connecting pillar 702, both of which are located on the left and right sides of the slot. Both the first buckle ring 502 and the second buckle ring 602 are equipped with a first limiting portion 5021. When the first trigger 5 and the second trigger 6 are in the closed position, the first limiting portion 5021 abuts against the connecting pillar 7 to prevent the first trigger 5 and the second trigger 6 from rotating in the direction away from the open position. Both the first buckle ring 502 and the second buckle ring 602 are equipped with a second limiting portion 5022. The second limiting portion 5022 on the first buckle ring 502 is adjacent to the first opening 503, while the second limiting portion 5022 on the second buckle ring 602 is adjacent to the second opening. When the first trigger 5 and the second trigger 6 are in the open position, the first limiting portion 5021 abuts against the connecting pillar 7 to prevent the first trigger 5 and the second trigger 6 from rotating in the direction away from the closed position. As shown in FIG. 6, the first limiting portion 5021 is located on the outer edge of the first buckle ring 502 and the second buckle ring 602. At this time, the first limiting portion 5021 on the first buckle ring 502 abuts against the left connecting pillar 701, preventing the first trigger 5 from continuing to rotate clockwise. The first limiting portion 5021 on the second buckle ring 602 abuts against the right connecting pillar 702, preventing the second trigger 6 from continuing to rotate counterclockwise.

In some embodiments, the push button connector further includes a first elastic member 13 and a second elastic member 14. The first elastic member 13 applies elastic force to the first trigger 5 to drive it towards the closed position, while the second elastic member 14 applies elastic force to the second trigger 6 to drive it towards the closed position. In specific embodiments, the first elastic member 13 is a first torsion spring sleeved on the first pivot 8, and the second elastic member 14 is a second torsion spring sleeved on the second pivot 9. One end of the first torsion spring is fixed to the first trigger 5, and the other end of the first torsion spring is fixed to the first panel 1 and/or the second panel 2. One end of the second torsion spring is fixed to the second trigger 6, and the other end of the second torsion spring is fixed to the first panel 1 and/or the second panel 2.

Referring to FIG. 6, in this embodiment, a first stop block 103 is provided on the first panel 1. The first stop block 103 is located on the left side of the first pivot 8, and the left end of the first torsion spring abuts against the first stop block 103. The first torsion spring provides elastic force to rotate the first trigger 5 clockwise. By the combined action of the left connecting pillar 701 and the first torsion spring, the first trigger 5 can be kept in the closed position. Similarly, a second stop block 202 is provided on the second panel 2. The second stop block 202 is located on the right side of the second pivot 9, and the right end of the second torsion spring abuts against the second stop block 202. The second torsion spring provides elastic force to rotate the second trigger 6 counterclockwise. By the combined action of the right connecting pillar 702 and the second torsion spring, the second trigger 6 can be kept in the closed position. The first elastic member 13 and the second elastic member 14 prevent the first trigger 5 and the second trigger 6 from opening in an uncontrolled manner, thus improving the safety of the connector.

In some embodiments, a first recess 1203 is provided on the slider 12, and a compression spring 28 is disposed in the first recess 1203. A sphere 15 is located between the compression spring 28 and the second panel 2. The diameter of the sphere 15 is smaller than the diameter of the first recess 1203 but larger than the inner diameter of the compression spring 28. A second recess 201 is provided on the second panel 2, and the depth of the second recess 201 is smaller than the radius of the sphere 15. When the first trigger 5 is in the open position, a portion of the sphere 15 is located within the first recess 1203, while another portion is located within the second recess 201. In this case, a certain amount of pushing force is required to move the slider 12, thereby preventing the first trigger 5 and the second trigger 6 from moving the slider 12 under the action of the first elastic member 13 and the second elastic member 14, allowing the first trigger 5 and the second trigger 6 to be locked in the open position, providing convenience for the user's use. When it is necessary to change the connecting buckle from the open state to the closed state, a downward pushing force is applied to the 1 3, causing the sphere 15 to slide out of the second recess 201, thus unlocking the buckle. Then, under the action of the first torsion spring and the second torsion spring, the first trigger 5 and the second trigger 6 automatically rotate from the open position to the closed position. The process of the first trigger 5 and the second trigger 6 rotating from the open position to the closed position can be achieved without the user applying a downward pushing force to the lever 3, making it very convenient to use.

Figure 8:
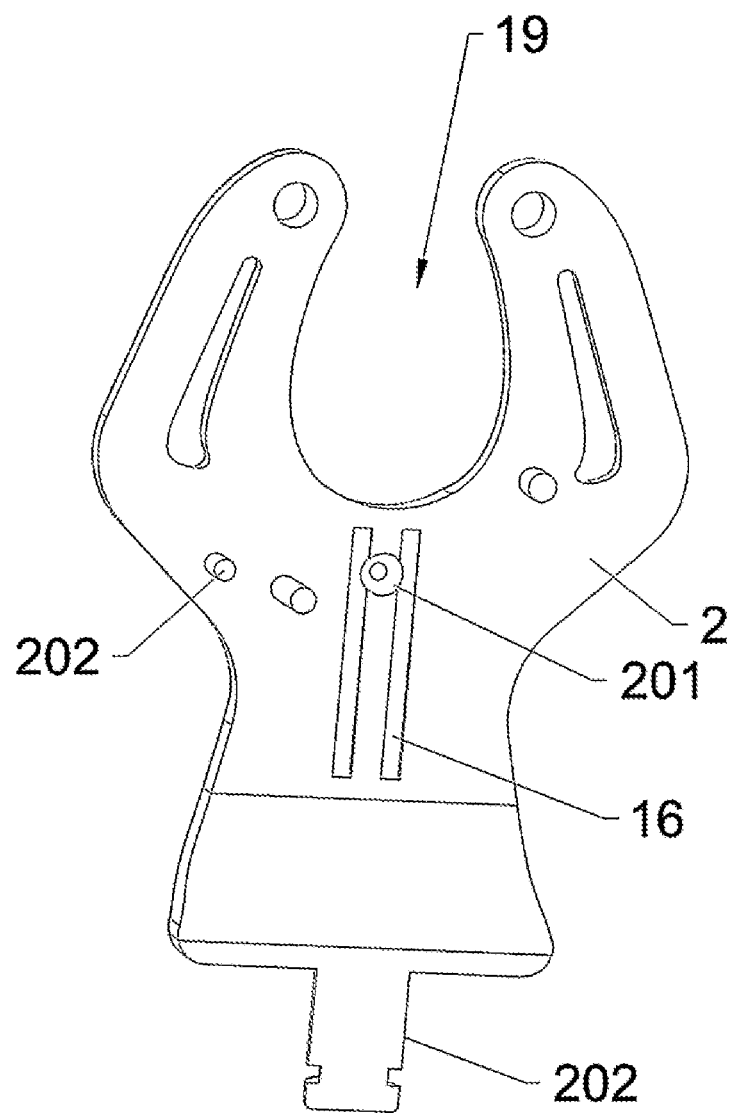
FIG. 8 shows a structural diagram of the second panel in the embodiment of the present application.

In some embodiments, a guide slot 16 is provided on the first panel 1 and/or the second panel 2, and the extension direction of the guide slot 16 is consistent with the movement direction of the slider 12. A guide block 1207 is provided on the slider 12, and at least a portion of the guide block 1207 is inserted into the guide slots 16. As shown in FIGS. 6 and 8, two parallel guide slots 16 are provided on both the first panel 1 and the second panel 2. Four guide blocks 1207 are provided on the end face of the slider 12 adjacent to the first panel 1, and four guide blocks 1207 are provided on the end face of the slider 12 adjacent to the second panel 2. The four guide blocks 1207 on the same end face of the slider 12 are located at the four corners of a rectangle. Two guide blocks 1207 are inserted into each guide slot 16. The stability of the slider 12 during movement is improved by the provided guide slots 16 and guide blocks 1207.

In some embodiments, the push button connector further includes a connecting member 4. The connecting member 4 is connected to at least one of the first panel 1 and the second panel 2, and a through-hole for the rope to pass through is provided on the connecting member 4. The connecting member 4 can be connected to either the first panel 1 or the second panel 2, or it can be connected to both the first panel 1 and the second panel 2. The drawings of the present disclosure only show examples where the connecting member 4 is connected to both the first panel 1 and the second panel 2, and the drawings related to the connecting member 4 being connected to either the first panel 1 or the second panel 2 are not shown.

Referring to FIG. 4, the connecting member 4 is generally ring-shaped, and the internal space of the ring is the through-hole for the rope 21 to pass through. When in use, it is convenient to thread the rope 21 through the through-hole, providing convenience for the user, and also reducing friction between the rope 21 and the components of the buckle connector, thereby ensuring a longer service life for the rope 21.

In some embodiments, the connecting member 4 is provided with mounting hole 401, the first panel 1 is provided with a first protrusion 102, and the second panel 2 is provided with a second protrusion. The first protrusion 102 and the second protrusion are inserted into the mounting hole 401, and the first protrusion 102 and the second protrusion are provided with anti-detachment blocks 17 away from one end of the first panel 1. The anti-detachment blocks 17 and the first panel 1 are located on opposite sides of the mounting hole 401. The mounting hole 401 is connected to the through-hole, and the anti-detachment block 17 is located inside the through-hole of the connecting member 4.

In more specific embodiments, the shape of the first protrusion 102 and the second protrusion are both semi-cylindrical. After the first protrusion 102 and the second protrusion are fitted together, they form a complete cylinder, and the connector 4 can rotate around the axis of this cylinder. In this case, the mounting hole 401 can be cylindrical, and the diameter of the mounting hole 401 is slightly larger than the diameter of the first protrusion 102 and the second protrusion for assembly convenience. Allowing the connector 4 to rotate around the first protrusion 102 and the second protrusion helps to avoid rope twisting. The shape of the anti-detachment block 17 on the first protrusion 102 and the second protrusion is also semi-cylindrical, and the diameter of the anti-detachment block 17 is larger than the diameter of the mounting hole 401. In specific implementations, the anti-detachment blocks 17 can be obtained through stamping processes.

FIGS. 13 and 14 show one example of the use of this connecting buckle. As shown in the FIGS., a D-shaped buckle 20 is inserted into the slot 19. The first ring 502 and the second ring 602 pass through the holes on the D-shaped buckle 20, and the rope 21 passes through the through-hole on the connector 4. When both the D-shaped buckle 20 and the rope 21 exert tension on the connecting buckle, the tension applied by the D-shaped buckle 20 and the tension applied by the rope 21 are in the same straight line. Therefore, the connecting buckle can maintain balance and avoid the risks caused by tilting.

The above description is only one specific embodiment of the present application. However, the scope of protection of the present application is not limited thereto. Any person skilled in the art can easily conceive of variations or substitutions within the technical scope disclosed in the present application, which should be encompassed within the scope of protection of the present application. Therefore, the scope of protection of the present application should be determined by the scope of the claims.

What is claimed is:

1. A push button connector, comprising:
a first panel, with a first pivot and a second pivot parallel to the first pivot on one side of the first panel;
a first trigger, comprising a first connecting portion and a first ring connected to each other, wherein the first connecting portion is connected to the first pivot and capable of rotating around the first pivot, and the first ring is circular and has a first opening;
a second trigger, comprising a second connecting portion and a second ring connected to each other, wherein the second connecting portion is connected to the second pivot and capable of rotating around the second pivot; and
a slider, connected to the first panel;
wherein the first trigger and the second trigger both have an open position where the first opening is open and a closed position where the second ring closes the first opening, and the slider simultaneously drives the first trigger and the second trigger to rotate between the open position and the closed position;
wherein the slider is slidably connected to the first panel, and the slider moves along a straight line perpendicular to the plane where the first pivot and the second pivot are located, one side of the slider has a first rack, and the other side of the slider has a second rack; the first connecting portion and the second connecting portion both have gear teeth, and the first rack engages with the teeth on the first connecting portion, while the second rack engages with the teeth on the second connecting portion.

2. The push button connector according to claim 1, further comprising a lever and a connecting rod, wherein the first panel has an elongated slot in the same direction as the movement direction of the slider; the lever and the slider are located on opposite sides of the first panel, and the connecting rod is located inside the slot, with one end connected to the lever and the other end connected to the slider.

3. The push button connector according to claim 1, further comprising a second panel connected to the first panel, wherein the first trigger, the second trigger, the slider, the first pivot, and the second pivot are located between the first panel and the second panel.

4. The push button connector according to claim 3, wherein the second buckle ring is approximately ring-shaped and has a second opening; when the first trigger and the second trigger are in the open position, a projection of the first opening on the first panel overlaps at least partially with the projection of the second opening on the first panel, so that the first opening and the second opening are simultaneously open; when the first trigger and the second trigger are in the closed position, the first buckle ring closes the second opening.

5. The push button connector according to claim 4, wherein one end of the first panel is provided with a groove, and one end of the groove is open; when the first trigger is in the open position, the projection of the first opening on the first panel coincides with the groove.

6. The push button connector according to claim 5, further comprising a connecting pillar, wherein one end of which is connected to the first panel, and the other end of which is connected to the second panel.

7. The push button connector according to claim 6, wherein the number of connecting pillars is two, and the two connecting columns are located on both sides of the slot.

8. The push button connector according to claim 7, wherein both the first buckle ring and the second buckle ring are provided with a first limiting portion; when the first trigger and the second trigger are in the closed position, the first limiting portion abuts against the connecting pillars to prevent the first trigger and the second trigger from rotating away from the open position.

9. The push button connector according to claim 8, wherein both the first buckle ring and the second buckle ring are provided with a second limiting portion; the second limiting portion on the first buckle ring is adjacent to the first opening, and the second limiting portion on the second buckle ring is adjacent to the second opening; when the first trigger and the second trigger are in the open position, the first limiting portion abuts against the connecting columns to prevent the first trigger and the second trigger from rotating away from the closed position.

10. The push button connector according to claim 3, further comprising a first elastic member and a second elastic member; wherein the first elastic member applies elastic force to the first trigger to drive the first trigger towards the closed position, and the second elastic member applies elastic force to the second trigger to drive the second trigger towards the closed position.

11. The push button connector according to claim 10, wherein the first elastic member is a first torsion spring fitted on the first pivot, the second elastic member is a second torsion spring fitted on the second pivot, one end of the first torsion spring is fixed to the first trigger, the other end of the first torsion spring is fixed to the first panel and/or the second panel, one end of the second torsion spring is fixed to the second trigger, and the other end of the second torsion spring is fixed to the first panel and/or the second panel.

12. The push button connector according to claim 3, wherein the slider is provided with a first recess, a compression spring is arranged inside the first recess, a sphere is located between the compression spring and the second panel, the diameter of the sphere is smaller than the diameter of the first recess and larger than the inner diameter of the compression spring, the second panel is provided with a second recess, the depth of the second recess is smaller than the radius of the sphere, when the first trigger is in an open position, a portion of the sphere is located inside the first recess, and another portion is located inside the second recess.

13. The push button connector according to claim 3, wherein the first panel and/or the second panel are provided with guide grooves, the extending direction of the guide grooves is consistent with the movement direction of the slider, the slider is provided with guide blocks, and at least a portion of the guide blocks is inserted into the guide grooves.

14. The push button connector according to claim 4, further comprising a connecting member, wherein the connecting member is connected to at least one of the first panel and the second panel, and the connecting member is provided with a through-hole for the rope to pass through.

15. The push button connector according to claim 14, wherein the connecting member is provided with a mounting hole, the first panel is provided with a first protrusion, the second panel is provided with a second protrusion, the first protrusion and the second protrusion are both inserted into the mounting hole, the first protrusion and the second protrusion are provided with anti-detachment blocks at a distance from one end of the first panel, and the anti-detachment blocks and the first panel are located on opposite sides of the mounting holes.

16. The push button connector according to claim 15, wherein the shape of the first protrusion and the second protrusion is both a semi-cylinder, when the first protrusion and the second protrusion are fitted together, they form a complete cylinder, and the connecting member rotates around the axis of the cylinder.

17. The push button connector according to claim 1, further comprising a second panel connected to the first panel, wherein the first trigger, the second trigger, the slider, the first pivot, and the second pivot are located between the first panel and the second panel.

18. The push button connector according to claim 2, further comprising a second panel connected to the first panel, wherein the first trigger, the second trigger, the slider, the first pivot, and the second pivot are located between the first panel and the second panel.

19. The push button connector according to claim 5, further comprising a connecting member, wherein the connecting member is connected to at least one of the first panel and the second panel, and the connecting member is provided with a through-hole for the rope to pass through.

\* \* \* \* \*